US012812676B2

(12) United States Patent
Fehrenbach et al.

(10) Patent No.: US 12,812,676 B2
(45) Date of Patent: Nov. 24, 2026

(54) USER DEVICE AND METHOD WITH RANDOM NUMBER GENERATOR RELATED ENHANCEMENTS

(71) Applicant: Fraunhofer-Gesellschaft zur Förderung der angewandten Forschung e.V., Munich (DE)

(72) Inventors: Thomas Fehrenbach, Berlin (DE); Baris Göktepe, Berlin (DE); Cornelius Hellge, Berlin (DE); Thomas Wirth, Berlin (DE); Thomas Schierl, Berlin (DE); Nithin Srinivasan, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 167 days.

(21) Appl. No.: 17/670,642

(22) Filed: Feb. 14, 2022

(65) Prior Publication Data

US 2022/0232634 A1 Jul. 21, 2022

Related U.S. Application Data

(63) Continuation of application No. PCT/EP2020/072799, filed on Aug. 13, 2020.

(30) Foreign Application Priority Data

Aug. 14, 2019 (EP) .................................... 19191858

(51) Int. Cl.
*H04W 74/08* (2024.01)
*H04W 74/00* (2009.01)
*H04W 74/0816* (2024.01)

(52) U.S. Cl.
CPC ..... *H04W 74/0816* (2013.01); *H04W 74/002* (2013.01)

(58) Field of Classification Search
CPC ........... H04W 74/002; H04W 74/0808; H04W 74/0816
See application file for complete search history.

(56) References Cited

U.S. PATENT DOCUMENTS 10,485,027 B2 * 11/2019 Mallik .............. H04W 72/0446
10,637,619 B2 * 4/2020 Ng ........................ H04L 5/0048
(Continued)

FOREIGN PATENT DOCUMENTS

CN 107079464 A 8/2017
CN 108476525 A 8/2018
(Continued)

OTHER PUBLICATIONS

"3GPP TS 36.211", 3rd Generation Partnership Project; Technical Specification Group Radio Access Network; Evolved Universal Terrestrial Radio Access (E-UTRA); Physical channels and modulation 2019.

(Continued)

*Primary Examiner* — Liton Miah
(74) *Attorney, Agent, or Firm* — ASHURST PERKINS COIE US LLP; Michael A. Glenn

(57) ABSTRACT

A user device, UE, for a wireless communication system according to an embodiment is provided. A backoff rule is stored within a storage of a base station and within a storage of the user device. Or, the user device is to transmit the backoff rule to the base station. Or, the user device is to receive the backoff rule from the base station. The user device is to determine a random backoff counter depending on the backoff rule. Moreover, the user device is to decrement the random backoff counter if a transmission channel is not occupied for a certain duration. Furthermore, the user
(Continued)

device is to transmit a data packet via the transmission channel, if the random backoff counter reaches a predefined value.

19 Claims, 4 Drawing Sheets

(56) References Cited

U.S. PATENT DOCUMENTS

| | | | | |
|---|---|---|---|---|
| 10,952,239 | B2 * | 3/2021 | Park | H04W 16/14 |
| 11,218,882 | B2 * | 1/2022 | Moon | H04W 16/14 |
| 2016/0127098 | A1 | 5/2016 | Ng et al. | |
| 2016/0338104 | A1 | 11/2016 | Yin et al. | |
| 2017/0188387 | A1 | 6/2017 | Mukherjee et al. | |
| 2017/0223740 | A1 | 8/2017 | Mallik et al. | |
| 2018/0049221 | A1 | 2/2018 | Park et al. | |
| 2018/0146478 | A1 * | 5/2018 | Kim | H04W 72/23 |
| 2018/0227769 | A1 | 8/2018 | Mushunuri et al. | |
| 2018/0302927 | A1 | 10/2018 | Noh et al. | |
| 2019/0014594 | A1 * | 1/2019 | Park | H04W 16/14 |
| 2020/0100293 | A1 * | 3/2020 | Larsson | H04W 74/0833 |

FOREIGN PATENT DOCUMENTS

| | | | |
|---|---|---|---|
| EP | 3410812 | A1 | 12/2018 |
| IN | 201827023215 | A | 8/2018 |
| WO | 2016072717 | A1 | 5/2016 |
| WO | 2016072788 | A1 | 5/2016 |
| WO | 2017026488 | A1 | 2/2017 |
| WO | 2017026937 | A1 | 2/2017 |
| WO | 2017131478 | A1 | 8/2017 |

OTHER PUBLICATIONS

"3GPP TS 38.211", 3rd Generation Partnership Project; Technical Specification Group Radio Access Network; NR; Physical channels and modulation (Release 15) 2019.

3GPP TSG RAN WG1 Meeting #82 R1-154066, Sharp, Backoff counter handling for intra-operator, Aug. 15, 2015—5 pages.

* cited by examiner

USER DEVICE AND METHOD WITH RANDOM NUMBER GENERATOR RELATED ENHANCEMENTS

CROSS-REFERENCE TO RELATED APPLICATIONS

This application is a continuation of copending International Application No. PCT/EP2020/072799, filed Aug. 13, 2020, which is incorporated herein by reference in its entirety, and additionally claims priority from European Application No. 19191858.0, filed Aug. 14, 2019, which is also incorporated herein by reference in its entirety.

The present application concerns the field of wireless communication systems or networks, more specifically, enhancements or improvements in the communication among entities of the wireless communication network. Embodiments concern enhancements or improvements for NR-U (New Radio in Unlicensed Spectrum) which are random number generator related according to the provided new and inventive concepts.

BACKGROUND OF THE INVENTION

FIG. 1 is a schematic representation of an example of a terrestrial wireless network 100 including, as is shown in FIG. 1(*a*), a core network 102 and one or more radio access networks $RAN_1$, $RAN_2$, . . . $RAN_N$. FIG. 1(*b*) is a schematic representation of an example of a radio access network $RAN_n$ that may include one or more base stations $gNB_1$ to $gNB_5$, each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. The example is not limited to terrestrial wireless networks, but network entities can involve non-terrestrial networks (NTN), where a parts of a BS, and/or BS and/or core network can be payload of a satellite (LEO, GEO, MEO) or high altitude platform (HAPs), e.g. balloon or special airplane.

FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g. via the S1 interface, via respective backhaul links $\mathbf{114}_1$ to $\mathbf{114}_5$, which are schematically represented in FIG. 1(*b*) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $\mathbf{116}_1$ to $\mathbf{116}_5$, which are schematically represented in FIG. 1(*b*) by the arrows pointing to "gNBs". The network can also contain UEs communicating in direct mode, also referred to as device-to-device (D2D) communication. This interface is often referred to as PC5 interface.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The sidelink can also comprise the physical sidelink feedback channel (PSFCH). The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard, or the 802.11ax, or the 802.11be.rules The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication systems or networks, like those described above with reference to FIG. 1, for example in a LTE or 5G/NR network, the respective entities may communicate using one of more frequency bands. A frequency band includes a start frequency, an end frequency and all intermediate frequencies between the start and end frequencies. In other words, the start, end and intermediate frequencies may define a certain bandwidth, e.g., 20 MHz. A frequency band may also be referred to as a carrier, a bandwidth part, BWP, a subband, and the like.

When using a single frequency band, the communication may be referred to as a single-band operation, e.g., a UE transmits/receives radio signals to/from another network entity on frequencies being within the 20 MHz band.

When using two or more frequency bands, the communication may be referred to as a multi-band operation or as a wideband operation or as a carrier aggregation operation. The frequency bands may have different bandwidths or the same bandwidth, like 20 MHz. For example, in case of frequency bands having the same bandwidths a UE may transmit/receive radio signals to/from another network entity on frequencies being within two or more of the 20 MHz bands so that the frequency range for the radio communication may be a multiple of 20 MHz. The two or more frequency bands may be continuous/adjacent frequency bands or some or all for the frequency bands may be separated in the frequency domain.

The multi-band operation may include frequency bands in the licensed spectrum, or frequency bands in the unlicensed spectrum, or frequency bands both in the licensed spectrum and in the unlicensed spectrum.

Carrier aggregation, CA, is an example using two or more frequency bands in the licensed spectrum and/or in the unlicensed spectrum.

5G New Radio (NR) may support an operation in the unlicensed spectrum so that a multi-band operation may include frequency bands in the unlicensed spectrum bands. This may be as NR-based access to unlicensed spectrum, NR-U, and the frequency bands may be referred to as subbands. The unlicensed spectrum may include bands with a potential IEEE 802.11 coexistence, such as the 5 GHz and the 6 GHz bands. NR-U may support bandwidths that are an integer multiple of 20 MHz, for example due to regulatory requirements. The splitting into the subbands is performed so as to minimize interference with coexisting systems, like IEE 802.11 systems, which may operate in one or more of the same bands with the same nominal bandwidth channels, like 20 MHz channels. Other examples, of coexisting systems may use subbands having subband sizes and nominal frequencies different from the above-described IEEE 802.11 systems. For example, the unlicensed spectrum may include the 5 GHz band, the 6 GHz band, the 24 GHz band or the 60 GHz band or even higher frequency bands. Examples of such unlicensed bands include the industrial, scientific and medical, ISM, radio bands reserved internationally for the use of radio frequency energy for industrial, scientific and medical purposes other than telecommunications.

During an operation using unlicensed subbands regulations may define that a Listen-before-talk, LBT, is to be performed separately per subband. This may lead to a situation in which one or more of the subbands are busy or occupied due to an interference, for example, from other communication systems coexisting on the same band, like other public land mobile networks, PLMNs or systems operating in accordance with the IEEE 802.11 specification. In such a situation, the transmitter, either the transmitting gNB or the transmitting UE, is only allowed to transmit on the subbands which are detected to be not busy, also referred to as subbands being free or non-occupied, as is determined by the LBT algorithm. For example for a transmission spanning more than 20 MHz in the 5 GHz operational unlicensed band, the transmitter, like the gNB or the UE, performs Listen-Before-Talk, LBT, separately on each subband. Once the LBT results are available for each subband, the devices, for example, the gNB in the downlink, DL, or the UE in the uplink, UL, are allowed to transmit on these subbands which are determined to be free or unoccupied, i.e., to transmit on the "won" subband(s). No transmission is allowed on the occupied, busy or "non-won" subbands.

It is noted that the information in the above section is only for enhancing the understanding of the background of the invention and therefore it may contain information that does not form conventional technology that is already known to a person of ordinary skill in the art.

In the 3GPP New Radio unlicensed (NR-U) and legacy standards, the transmission from a UE as well as a gNB is also dependent on the outcome of the listen before talk (LBT) procedure.

This procedure uses a random backoff to limit collisions during channel access. This randomness limits scheduler efficiency as the backoff time may not be known by other transmitters in the network.

SUMMARY

An embodiment may have a user device, UE, for a wireless communication system, wherein a backoff rule is stored within a storage of a base station and within a storage of the user device; or the user device is to transmit the backoff rule to the base station; or the user device is to receive the backoff rule from the base station, wherein, the user device is to determine a random backoff counter depending on the backoff rule, wherein the user device is to decrement the random backoff counter if a transmission channel is not occupied for a certain duration, wherein the user device is to transmit a data packet via the transmission channel, if the random backoff counter reaches a predefined value.

Another embodiment may have a base station, gNB, for a wireless communication system, wherein a backoff rule is stored within a storage of the base station and within a storage of a user device; or the base station is to receive the backoff rule from the user device; or the base station is to transmit the backoff rule to the user device, wherein, the user device is to determine a random backoff counter depending on the backoff rule and is to start a transmission of a data packet via a transmission channel depending on the backoff counter and depending on whether or not the transmission channel is occupied.

According to another embodiment, a wireless communication system may have: one or more inventive user devices, wherein each of the one or more user devices is an inventive user device user device, UE, for a wireless communication system, and an inventive base station, gNB, for a wireless communication system.

According to another embodiment, a method for operating a wireless communication system may have the steps of: storing a backoff rule within a storage of a base station and within a storage of a user device; or transmitting the backoff rule from the user device to the base station; or receiving the backoff rule at the user device from the base station, determining, by the user device, a random backoff counter depending on the backoff rule, decrementing, by the user device, the random backoff counter if a transmission channel is not occupied for a certain duration, transmitting, by the user device, a data packet via the transmission channel, if the random backoff counter reaches a predefined value.

According to another embodiment, a method for operating a wireless communication system may have the steps of: storing a backoff rule within a storage of a base station and storing the backoff rule within a storage of a user device; or receiving the backoff rule from the user device at the base station; or transmitting the backoff rule from the base station to the user device, wherein, the user device determines a random backoff counter depending on the backoff rule and starts a transmission of a data packet via a transmission channel depending on the backoff counter and depending on whether or not the transmission channel is occupied.

Another embodiment may have a non-transitory digital storage medium having a computer program stored thereon to perform any of the inventive methods when said computer program is run by a computer.

A user device, UE, for a wireless communication system according to an embodiment is provided. A backoff rule is stored within a storage of a base station and within a storage of the user device. Or, the user device is to transmit the backoff rule to the base station. Or, the user device is to receive the backoff rule from the base station. The user device is to determine a random backoff counter depending on the backoff rule. Moreover, the user device is to decrement the random backoff counter if a transmission channel is not occupied for a certain duration. Furthermore, the user device is to transmit a data packet via the transmission channel, if the random backoff counter reaches a predefined value.

Moreover, a base station, gNB, for a wireless communication system according to an embodiment is provided. A backoff rule is stored within a storage of the base station and within a storage of a user device. Or, the base station is to receive the backoff rule from the user device. Or, the base station is to transmit the backoff rule to the user device. The user device is to determine a random backoff counter depending on the backoff rule and is to start a transmission of a data packet via a transmission channel depending on the backoff counter and depending on whether or not the transmission channel is occupied.

Furthermore, a method for operating a wireless communication system according to an embodiment is provided. The method comprises:

- Storing a backoff rule within a storage of a base station and within a storage of a user device; or transmitting the backoff rule from the user device to the base station; or receiving the backoff rule at the user device from the base station.
- Determining, by the user device, a random backoff counter depending on the backoff rule.
- Decrementing, by the user device, the random backoff counter if a transmission channel is not occupied for a certain duration.
- Transmitting, by the user device, a data packet via the transmission channel, if the random backoff counter reaches a predefined value.

Moreover, a method for operating a wireless communication system according to an embodiment is provided. The method comprises:

- Storing a backoff rule within a storage of a base station and storing the backoff rule within a storage of a user device; or receiving the backoff rule from the user device at the base station; or transmitting the backoff rule from the base station to the user device.

The user device determines a random backoff counter depending on the backoff rule and starts a transmission of a data packet via a transmission channel depending on the backoff counter and depending on whether or not the transmission channel is occupied.

Furthermore, a computer program product comprising instructions which, when the program is executed by a computer, causes the computer to carry out one or more of the above-described methods is provided.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention are now described in more detail with reference to the accompanying drawings in which the same or similar elements have the same reference signs assigned.

Figure 1A:
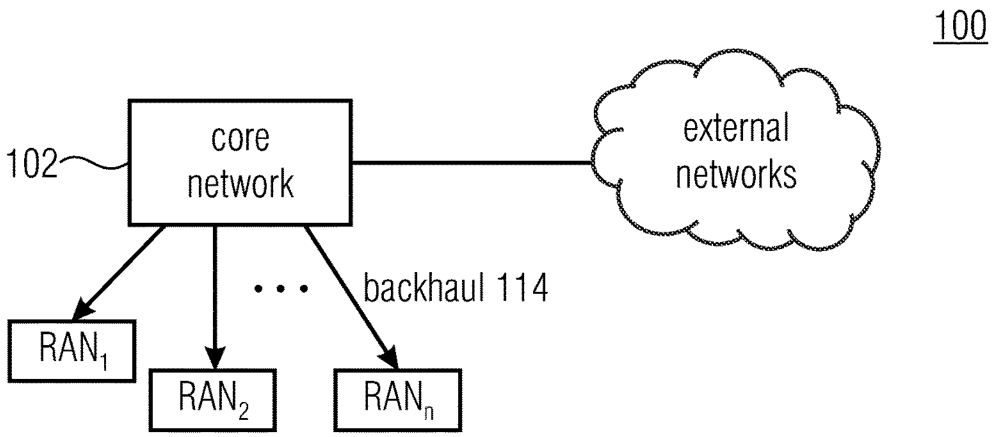
FIG. 1*a-b* illustrates a schematic representation of an example of a wireless communication system.
Figure 1B:
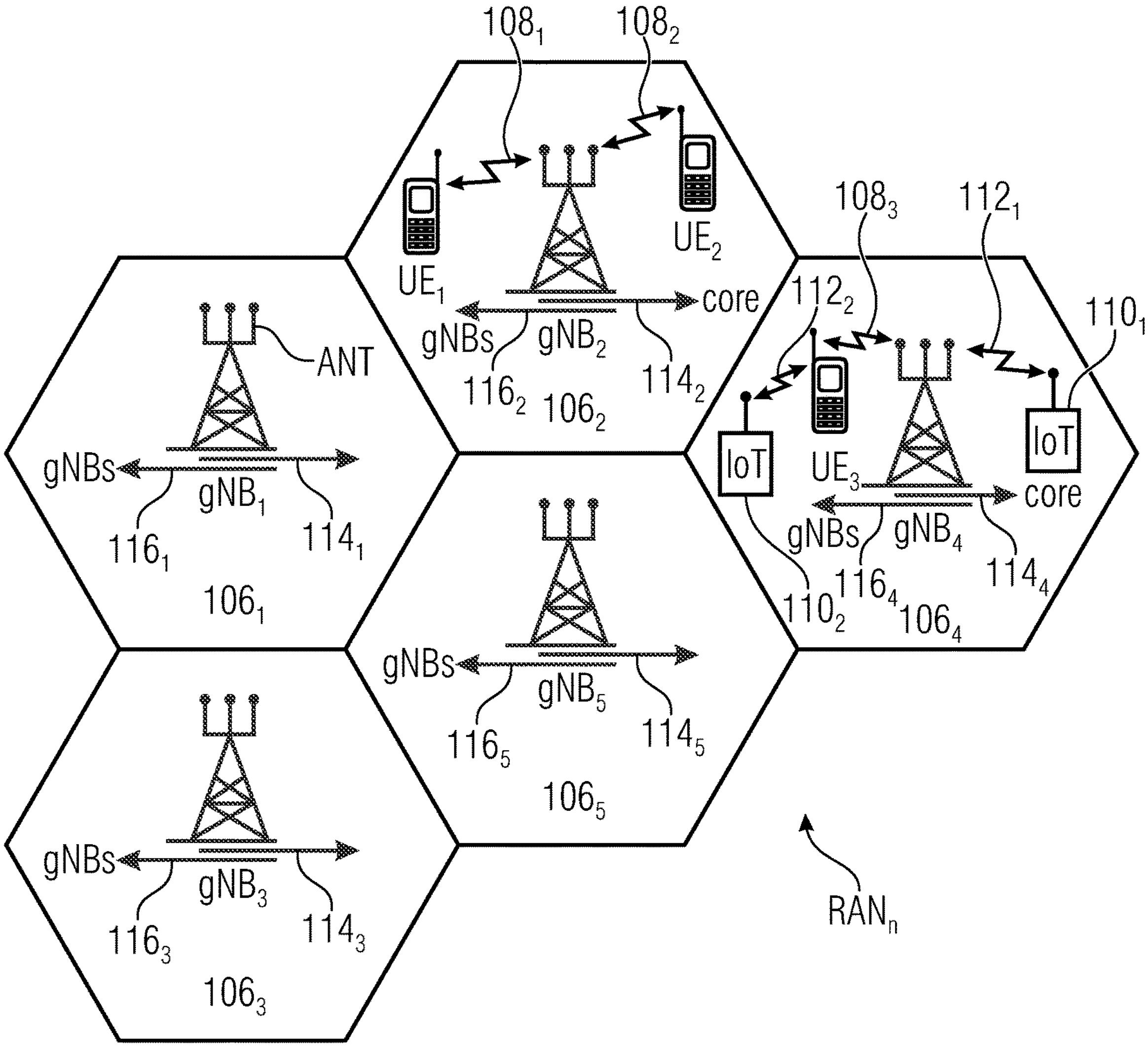
Figure 2:
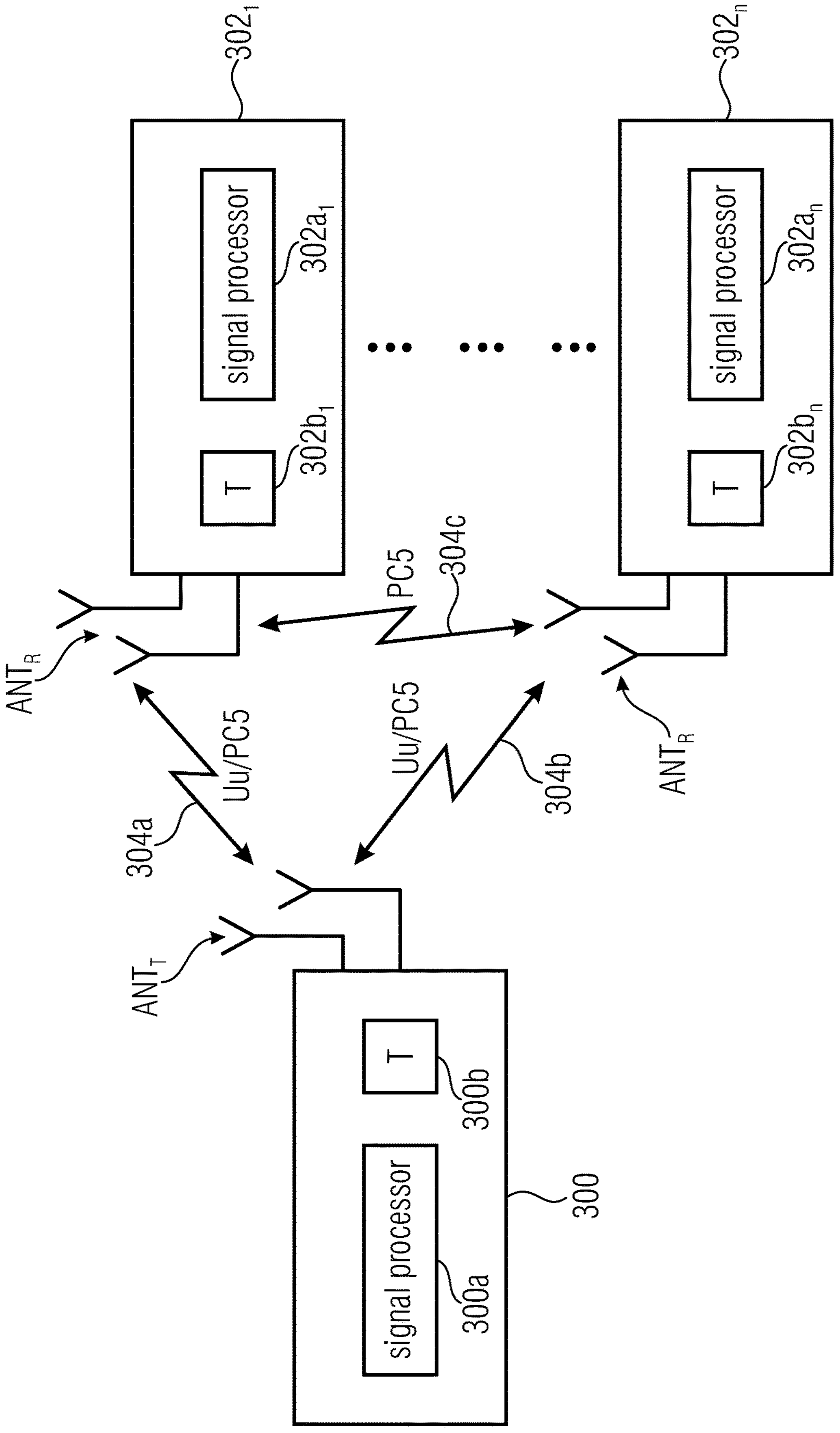
FIG. 2 illustrates a schematic representation of a wireless communication system including a transceiver, like a base station, and one or more transceivers, like user devices, UEs.

Embodiments of the present invention may be implemented in a wireless communication system as depicted in FIG. 1 including base stations and users, like mobile terminals or IoT devices. FIG. 2 is a schematic representation of a wireless communication system including a transceivers 300, like a base station, and one or more other transceivers 302$_1$ to 302$_n$, like user devices, UEs. The base station 300 and the user devices 302 may communicate via one or more wireless communication links or channels 304*a*, 304*b*, 304*c*, like a radio link. The base station 300 may include one or more antennas $ANT_T$ or an antenna array having a plurality of antenna elements, a signal processor 300*a* and a transceiver unit 300*b*, coupled with each other. The user devices 302 include one or more antennas $ANT_R$ or an antenna array having a plurality of antennas, a signal processor 302*a*$_1$, 302*a*$_n$, and a transceiver unit 302*b*$_1$, 302*b*$_n$ coupled with each other. The base station 300 and the UEs 302 may communicate via respective first wireless communication links 304*a* and 304*b*, like a radio link using the Uu interface, while the UEs 302 may communicate with each other via a second wireless communication link 304*c*, like a radio link using the PC5 interface. When the UEs 302 are not served by the base station 300, are not be connected to a base station, for example, they are not in an RRC connected state wrt. the network, or, more generally, when no resource allocation configuration or assistance is provided by the base station 300, the UEs 302 may communicate with each other over the sidelink directly. The system, the one or more UEs 302 and the base stations 300 may operate in accordance with the inventive teachings described herein.

A user device, UE, for a wireless communication system according to an embodiment is provided. The user device may, e.g., be one of the user devices $\mathbf{302}_1, \ldots \mathbf{302}_n$ of FIG. 2, for example, user device $\mathbf{302}_1$.

A backoff rule is stored within a storage of a base station 300 and within a storage of the user device. Or, the user device transmits the backoff rule to the base station 300. Or, the user device receives the backoff rule from the base station 300.

The user device $\mathbf{302}_1$ determines a random backoff counter depending on the backoff rule. (For example, the signal processor $\mathbf{302}a_1$ of the user device $\mathbf{302}_1$ may determine the random backoff counter.)

Moreover, the user device $\mathbf{302}_1$ decrements the random backoff counter if a transmission channel is not occupied for a certain duration.

Furthermore, the user device $\mathbf{302}_1$ transmits a data packet via the transmission channel (e.g., using its transceiver unit $\mathbf{302}b_1$), if the random backoff counter reaches a predefined value.

Embodiments are based on the finding that it is useful that the base station is in possession of the backoff rule according to which the user device determines the random backoff counter. Being in possession of the backoff rule of the user device allows to enhance the capabilities of the base station. For example, the base station can (at least roughly) estimate the duration of the time period during which the user device defers a transmission in case of an occupied. Or, the base station can, for example, estimate an average delay of a planned transmission at the user devices, etc. On the other hand, with respect to the user device, it is needed that the user device obeys the backoff rule which is known by the base station so that the base station can conduct proper estimations/determinations of backoff times.

According to an embodiment, the user device $\mathbf{302}_1$ does not change the random backoff counter while the transmission channel is occupied.

In an embodiment, the predefined value is zero.

According to an embodiment, the certain duration may depend on a transmission priority for transmitting the data packet.

For example, the transmission priority may, e.g., be a priority value, e.g., an integer value between 1 and 4 (1; 2; 3; 4). Priority value 1 may indicate highest priority; priority value 4 may, e.g., indicate lowest priority. If a transmission has, e.g., priority value 4, the user device may, e.g., decrement the random backoff counter after determining that four listen-before-talk slots of the transmission channel have not been occupied. If a transmission has, e.g., priority value 3, the user device may, e.g., decrement the random backoff counter after determining that three listen-before-talk slots of the transmission channel have not been occupied. If a transmission has, e.g., priority value 2, the user device may, e.g., decrement the random backoff counter after determining that two listen-before-talk slots of the transmission channel have not been occupied. And, if a transmission has, e.g., priority value 1, the user device may, e.g., decrement the random backoff counter after determining that one listen-before-talk slot of the transmission channel has not been occupied.

In some embodiments, the random backoff counter may, e.g., be determined pre-backoff. That means, when the user device 302 intends to transmit, the random backoff counter is determined, then backoff and sensing takes place, wherein the duration depends on the random backoff counter and the priority of the transmission, and then, the transmission is conducted by the user equipment.

In other embodiments, the random backoff counter may, e.g., be determined post-backoff. That means, after backoff, channel sensing and transmission has been conducted, the random backoff counter is immediately been determined, even without that the user device intends to immediately transmit a further data packet. Then the backoff counter is decremented, if the channel is determined to be free for a certain duration, up to reaching a another predefined value which is larger than the predefined value at which the user device would start transmitting. When later on, the user device 302 intends to transmit a further data packet, sensing takes place, wherein the duration depends on the remaining value of the already determined random backoff counter, and then, the transmission of the further packet is conducted by the user equipment.

According to an embodiment, the user device $\mathbf{302}_1$ may transmit the data packet via the transmission channel to the base station 300, if the random backoff counter reaches the predefined value.

In an embodiment, the backoff rule may comprise a pseudo random number generator algorithm. The pseudo random number generator algorithm is stored within the storage of the base station 300 and is stored within the storage of the user device $\mathbf{302}_1$. Or, the user device $\mathbf{302}_1$ is may transmit the pseudo random number generator algorithm or an algorithm indication indicating the pseudo random number generator algorithm to the base station 300. Or, the user device $\mathbf{302}_1$ may receive the pseudo random number generator algorithm or the algorithm indication indicating the pseudo random number generator algorithm from the base station 300.

The pseudo random number algorithm may, e.g., be specified or may, e.g., be pre-configured.

According to an embodiment, the pseudo random number generator algorithm may e.g., be a Gold sequence generator algorithm. Or, the pseudo random number generator algorithm may e.g., be a Mersenne-Twister algorithm. Or, the pseudo random number generator algorithm may e.g., be a xorshift generator algorithm. Or, the pseudo random number generator algorithm may e.g., be a WELL generator algorithm.

In an embodiment, the backoff rule comprises a seed. The seed may e.g., be stored within the storage of the base station 300 and may e.g., be stored within the storage of the user device $\mathbf{302}_1$. Or, the user device may transmit the seed to the base station 300. Or, the user device $\mathbf{302}_1$ may receive the seed from the base station 300.

In embodiments, at least parts of the seed may, e.g., need to be dynamic.

According to an embodiment, the user device $\mathbf{302}_1$ may e.g., be preconfigured with the pseudo random number generator algorithm and/or with seed information, wherein the seed depends on the seed information.

In general, different user devices within a wireless network may, e.g., have different seeds.

In an embodiment, the seed may depend on information that is available at the user device $\mathbf{302}_1$ and the base station 300, or on information that the user device $302_1$ may transmit to the base station 300, or on information that the user device $302_1$ may receive from the base station 300.

According to an embodiment, the seed may depend on one or more of:

- a user identifier, user ID, and/or a user device specific radio network temporary identifier, RNTI,
- a cell identifier, cell ID,
- timing information, which, for example, depends on an OFDM symbol number and/or a slot number and/or a subframe number and/or a frame number,
- the seed, wherein the user device $302_1$ is to receive the seed from the base station 300,
- the seed, wherein the seed is user-device-generated, and the user device $302_1$ is to transmit the seed to the base station 300.

In an embodiment, the user device $302_1$ may communicate over a sidelink or over a D2D interface, wherein, for example, the base station 300 is another user device. The other user device may, e.g., be a RSU road side unit or a Group leader UE (V2X), or a Master UE, or a iPhone® communication with watch, or a IoT master (IoT node with good connectivity).

Moreover, a base station 300, gNB, for a wireless communication system according to an embodiment is provided.

A backoff rule is stored within a storage of the base station 300 and within a storage of a user device $302_1$. Or, the base station 300 receives the backoff rule from the user device $302_1$. Or, the base station 300 transmits (e.g., using its transceiver unit 300*b*) the backoff rule to the user device $302_1$. The user device $302_1$ determines a random backoff counter depending on the backoff rule and is to start a transmission of a data packet via a transmission channel depending on the backoff counter and depending on whether or not the transmission channel is occupied.

According to an embodiment, the backoff rule may, e.g., comprise a pseudo random number generator algorithm. The pseudo random number generator algorithm is stored within the storage of the base station 300 and is stored within the storage of the user device $302_1$. Or, the base station 300 may receive the pseudo random number generator algorithm or an algorithm indication indicating the pseudo random number generator algorithm from the user device $302_1$. Or, the base station 300 may transmit the pseudo random number generator algorithm or the algorithm indication indicating the pseudo random number generator algorithm to the user device $302_1$.

In an embodiment, the pseudo random number generator algorithm may e.g., be a Gold sequence generator algorithm. Or, the pseudo random number generator algorithm may e.g., be a Mersenne-Twister algorithm. Or, the pseudo random number generator algorithm may e.g., be a xorshift generator algorithm. Or the pseudo random number generator algorithm may e.g., be a WELL generator algorithm.

According to an embodiment, the backoff rule comprises a seed. The seed may e.g., be stored within the storage of the base station 300 and may e.g., be stored within the storage of the user device $302_1$. Or, the base station 300 may receive the seed from the base station 300. Or, the base station 300 may transmit the seed to the user device $302_1$.

In an embodiment, the base station 300 may e.g., be preconfigured with the pseudo random number generator algorithm and/or with seed information, wherein the seed depends on the seed information.

According to an embodiment, the seed may e.g., depend on information that is available at the user device $302_1$ and the base station 300, or on information that the base station 300 may transmit to the user device $302_1$, or on information that the base station 300 may receive from the user device $302_1$.

In an embodiment, the seed may e.g., depend on one or more of:

- a user identifier, user ID, and/or a user device specific radio network temporary identifier, RNTI,
- a cell identifier, cell ID,
- timing information, which, for example, depends on an OFDM symbol number and/or a slot number and/or a subframe number and/or a frame number,
- the seed, wherein the user device $302_1$ is to receive the seed from the base station 300,
- the seed, wherein the seed is user-device-generated, and the user device $302_1$ is to transmit the seed to the base station 300.

According to an embodiment, the user device $302_1$ is one of a plurality of user devices $302_1$, . . . $302_n$, and the backoff rule is one of a plurality of backoff rules. For each user device of the plurality of user devices $302_1$, . . . $302_n$, one of the plurality of backoff rules is assigned to said user device. The plurality of backoff rules may e.g., be stored within a storage of a base station 300, and each backoff rule of the plurality of backoff rules may e.g., be stored within one of the plurality of user devices $302_1$, . . . $302_n$ to which said backoff rule is assigned. Or, the base station 300 may receive the plurality of backoff rules from the plurality of user devices $302_1$, . . . $302_n$. Or, for each of the plurality of backoff rules, the base station 300 may transmit said backoff rule to one of the plurality of user devices $302_1$, . . . $302_n$ to which said backoff rule is assigned.

In an embodiment, the base station 300 may conduct scheduling depending on the plurality of backoff rules. For example, scheduling may, e.g., be conducted by the signal processor 300*a* of the base station 300.

According to an embodiment, for a user device $302_1$ of the plurality of user devices $302_1$, . . . , $302_n$, the base station 300 may estimate, depending on the backoff rule being assigned to the user device $302_1$, a time period during which the user device $302_1$ is not expected to transmit via the transmission channel, and the base station does not monitor whether or not the user device $302_1$ transmits via the transmission channel during the time period. For example, the base station 300 may, e.g., determine the backoff counter value depending on the backoff rule and may estimate the time period during which it does not expect the user device $302_1$ to transmit via the transmission channel from the determined backoff counter value.)

(E.g., before at least the time corresponding to the backoff counter value that has been drawn from the random number generator.)

In an embodiment, the base station 300 may determine a channel business at the user device depending on the plurality of backoff rules.

According to an embodiment, the base station 300 may determine the channel business by determining a channel business ratio CBR according to $$CBR=(N\_tx-N\_bo)/N\_tx,$$

N_tx is a number of Listen-before-talk, LBT, slots from the beginning of a grant till an actual transmission. N_bo is the number of Listen-before-talk slots which was drawn by a pseudo random number generator as backoff.

Furthermore, a wireless communication system according to an embodiment is provided. The wireless communication system comprises one or more user devices, $302_1, \ldots, 302_n$ as described above and a base station 300 as described above.

In the following, embodiments of the present invention are described in more detail.

In embodiments, to overcome the issue of not knowing the backoff time while still fulfilling the needed random backoff a pseudo random number generator (PRNG) with a seed which is known/derivable for both parties, is proposed. This way any transceiver in the network can calculate the current backoff timer of any other UE, if it knows the seed being used.

The seed can either be signaled or derived from known user specific as well as global properties.

Embodiment-1: The PRNG algorithm as well as the information used to calculate the seed is preconfigured or configured to the UE.

For example, The PRNG algorithm may be a Gold sequence generator, such as in 36.211 or 38.211, Mersenne-Twister, xorshift generators, WELL generators, or any other pseudo random number generator which is used for calculating the random backoff value.

The seed is also calculated based on a pre-configured or configured formula which includes information which is available to both sides, such as:

User ID, UE-specific RNTI

Cell ID

Timing information, e.g. slot, subframe, frame number

In this way the gNB can calculate the current minimum random backoff values of all UEs in the network making better scheduling decisions, since it knows the earliest point in time when the UE will start.

Furthermore, the gNB does not have to monitor the channel for the transmission of that specific UE which saves power at the gNB side.

In a further embodiment, we propose to exploit the information on the difference of the calculated random backoff and the actual transmission time to derive information on the channel occupation at the UE side. Since the delay compared to the calculated random backoff is caused by a busy channel at the UE, the gNB implicitly knows the channel busy ratio (CBR) by the following relation:

$$\text{CBR}=(N\_tx-N\_bo)/N\_tx,$$

where N_tx is the number of LBT slots from the beginning of the grant till the actual transmission and N_bo is the number of LBT slots which was drawn by the PRNG as backoff.

Figure 4:
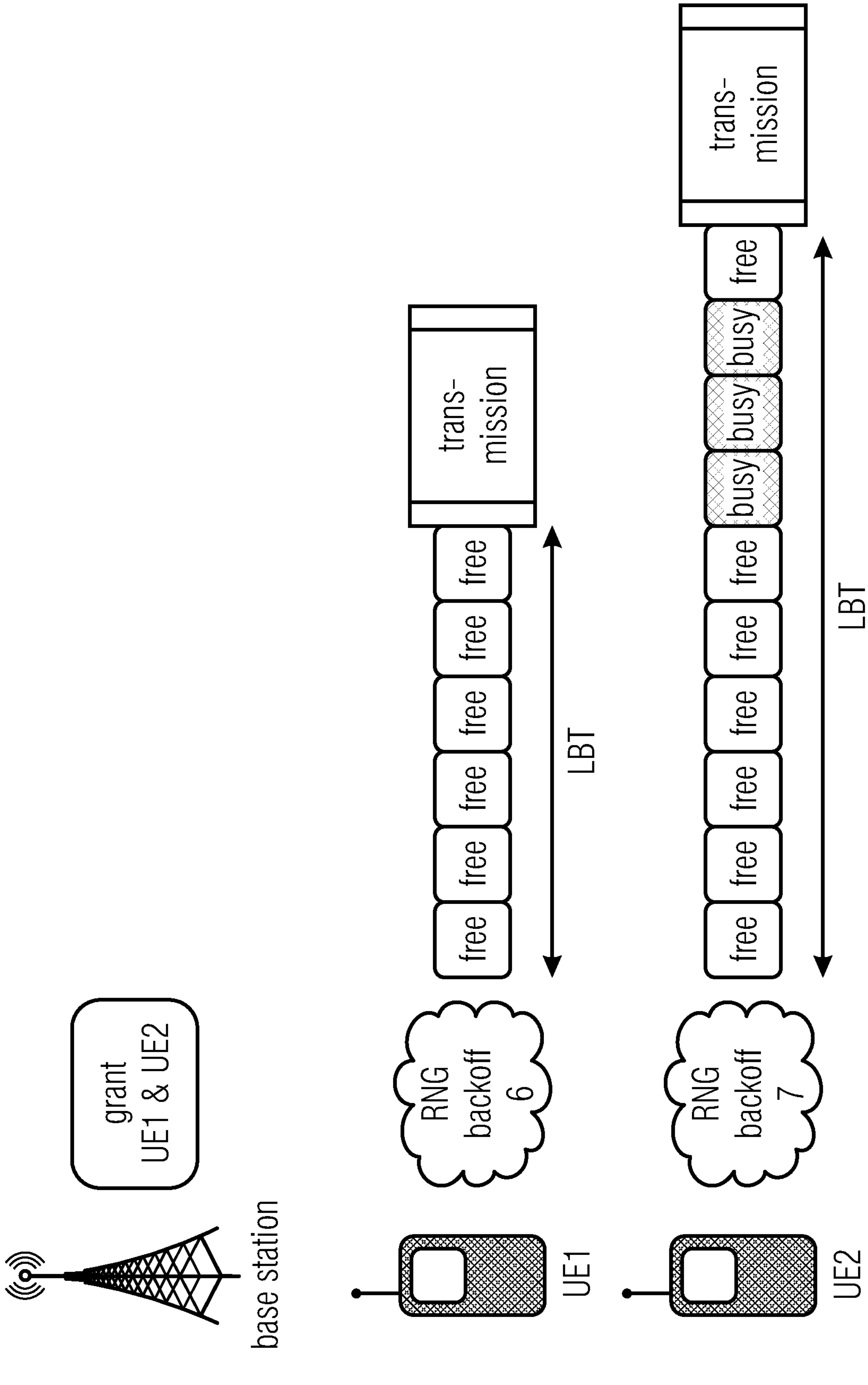
FIG. 4 illustrates to user devices, UEs, having a random backoff timer and a base station according to an embodiment.

For example, by scheduling 2 UEs that have a random backoff timer of 6 and 7 leads to minimal pauses between uplink transmissions as shown in FIG. 4.

FIG. 4 illustrates to user devices, UEs, having a random backoff timer and a base station according to an embodiment.

Alternatively, the RNG (random number generator) can be configured by the network during connection setup.

This can for example be done using RRC (radio resource control) signaling to initialize the RNG with a given seed.

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a UE may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator, or a Wifi non-AP STA (AP=Access Point; STA=Station, user device in IEEE 802.11), e.g. 802.11ax or 802.11be. In accordance with embodiments, a base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system, or a Wifi AP STA, e.g. 802.11ax or 802.11be.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system.

Figure 3:
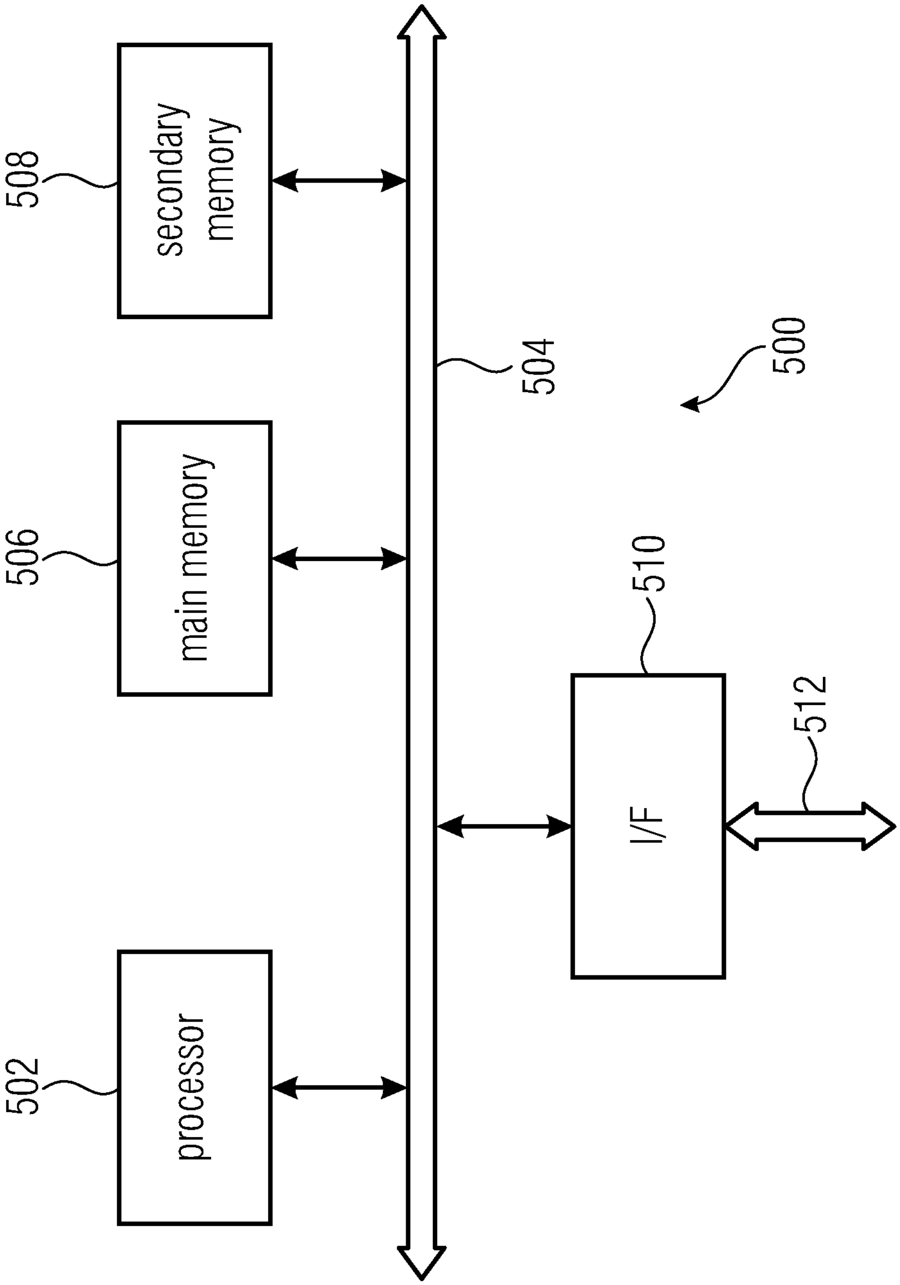
FIG. 3 illustrates an example of a computer system on which units or modules as well as the steps of the methods described in accordance with the inventive approach may execute.

FIG. 3 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

RNG Random Number Generator
PRNG Pseudo Random Number Generator
eNB Evolved Node B (3G base station)
LTE Long-Term Evolution
UE User Equipment (User Terminal)
RSU Road Side Unit
Uu eNB-UE link
PC5 UE-UE link/Interface using Sidelink Channel for D2D communication
D2D Device-to-device
IE Information Element
V2V Vehicular-to-vehicular communications
V2X Vehicular-to-everything communications
HARQ Hybrid Automatic Repeat Request
NR-U New Radio in unlicensed spectrum
BS Base Station
gNB Generation Node B (base station)
RAN Radio Access Network
FDM Frequency Division Multiplexing
RA Resource Allocation
SCI Sidelink Control Information
SL Sidelink
sTTI Short(end) Transmission Time Interval
PUCCH Physical Uplink Control Channel
PDCCH Physical Downlink Control Channel
DMRS Demodulation Reference Signal
CBR Channel Busy Ratio
COT Channel occupancy time
CWS Contention Window Size
RtoTx Ready to Transmit
RtoRx Ready to Receive
LBT Listen-before-Talk
LBR Listen-before-Receive

The invention claimed is:

1. A user device, UE, for a wireless communication system, wherein a backoff rule is stored within a storage of a base station and within a storage of the user device; or the user device is to receive the backoff rule from the base station, wherein, the user device is to determine a random backoff counter depending on the backoff rule, wherein the user device is configured to determine if a transmission channel is not occupied for a certain duration; and, if the transmission channel is not occupied for the certain duration, the user device is configured to decrement the random backoff counter, wherein the user device is to transmit a data packet via the transmission channel, if the random backoff counter reaches a predefined value, wherein the certain duration depends on a transmission priority for transmitting the data packet.

2. The user device according to claim 1, wherein the user device is to not change the random backoff counter while the transmission channel is occupied.

3. The user device according to claim 1, wherein the predefined value is zero.

4. The user device according to claim 1, wherein the user device is to transmit the data packet via the transmission channel to the base station, if the random backoff counter reaches the predefined value.

5. The user device according to claim 1, wherein the backoff rule comprises a pseudo random number generator algorithm, wherein the pseudo random number generator algorithm is stored within the storage of the base station and is stored within the storage of the user device; or the user device is to transmit the pseudo random number generator algorithm or an algorithm indication indicating the pseudo random number generator algorithm to the base station; or the user device is to receive the pseudo random number generator algorithm or the algorithm indication indicating the pseudo random number generator algorithm from the base station.

6. The user device according to claim 5, wherein the pseudo random number generator algorithm is a Gold sequence generator algorithm, or wherein the pseudo random number generator algorithm is a Mersenne-Twister algorithm, or wherein the pseudo random number generator algorithm is a xorshift generator algorithm, or wherein the pseudo random number generator algorithm is a WELL generator algorithm.

7. The user device according to claim 5, wherein the backoff rule comprises a seed, wherein the seed is stored within the storage of the base station and is stored within the storage of the user device; or the user device is to transmit the seed to the base station; or the user device is to receive the seed from the base station.

8. The user device according to claim 7, wherein the user device is preconfigured with the pseudo random number generator algorithm and/or with seed information, wherein the seed depends on the seed information.

9. The user device according to claim 7, wherein the seed depends on information that is available at the user device and the base station, or on information that the user device is to transmit to the base station, or on information that the user device is to receive from the base station.

10. The user device according to claim 7, wherein the seed depends on one or more of:

a user identifier, user ID, and/or a user device specific radio network temporary identifier, RNTI, a cell identifier, cell ID, timing information, which, for example, depends on an OFDM symbol number and/or a slot number and/or a subframe number and/or a frame number, the seed, wherein the user device is to receive the seed from the base station, the seed, wherein the seed is user-device-generated, and the user device is to transmit the seed to the base station.

11. The user device according to claim 1, wherein the user device is to communicate over a sidelink or over a D2D interface, wherein, for example, the base station is another user device.

12. A base station, gNB, for a wireless communication system, wherein a backoff rule is stored within a storage of the base station and within a storage of a user device; or the base station is to transmit the backoff rule to the user device, wherein, the user device is to determine a random backoff counter depending on the backoff rule, wherein the user device is to determine if a transmission channel is not occupied for a certain duration; and, if the transmission channel is not occupied for the certain duration, the user device is to decrement the random backoff counter; and is to start a transmission of a data packet via a transmission channel depending on the backoff counter and depending on whether or not the transmission channel is occupied, wherein the certain duration depends on a transmission priority for transmitting the data packet.

13. The base station according to claim 12, wherein the backoff rule comprises a pseudo random number generator algorithm, wherein the pseudo random number generator algorithm is stored within the storage of the base station and is stored within the storage of the user device; or the base station is to receive the pseudo random number generator algorithm or an algorithm indication indicating the pseudo random number generator algorithm from the user device; or the base station is to transmit the pseudo random number generator algorithm or the algorithm indication indicating the pseudo random number generator algorithm to the user device.

14. The base station according to claim 13, wherein the backoff rule comprises a seed, wherein the seed is stored within the storage of the base station and is stored within the storage of the user device; or the base station is to receive the seed from the base station; or the base station is to transmit the seed to the user device.

15. A wireless communication system, comprising:

one or more user devices, wherein each of the one or more user devices is a user device according to claim 1, and a base station, gNB, for a wireless communication system, wherein a backoff rule is stored within a storage of the base station and within a storage of a user device; or the base station is to transmit the backoff rule to said user device, wherein, the user device is to determine a random backoff counter depending on the backoff rule and is to start a transmission of a data packet via a transmission channel depending on the backoff counter and depending on whether or not the transmission channel is occupied.

16. A method for operating a wireless communication system, wherein the method comprises:

storing a backoff rule within a storage of a base station and within a storage of a user device; or receiving the backoff rule at the user device from the base station, determining, by the user device, a random backoff counter depending on the backoff rule, determining by the user device, if a transmission channel is not occupied for a certain duration; and, if the transmission channel is not occupied for the certain duration, decrementing the random backoff counter by the user device, transmitting, by the user device, a data packet via the transmission channel, if the random backoff counter reaches a predefined value, wherein the certain duration depends on a transmission priority for transmitting the data packet.

17. A method for operating a wireless communication system, wherein the method comprises:

Storing a backoff rule within a storage of a base station and storing the backoff rule within a storage of a user device; or transmitting the backoff rule from the base station to the user device, wherein, the user device determines a random backoff counter depending on the backoff rule, wherein the user device determines if a transmission channel is not occupied for a certain duration; and, if the transmission channel is not occupied for the certain duration, the user device decrements the random backoff counter; and starts a transmission of a data packet via a transmission channel depending on the backoff counter and depending on whether or not the transmission channel is occupied, wherein the certain duration depends on a transmission priority for transmitting the data packet.

18. A non-transitory computer-readable medium comprising a computer program product comprising instructions which, when the program is executed by a computer, causes the computer to carry out one or more methods in accordance with claim 16.

19. A non-transitory computer-readable medium comprising a computer program product comprising instructions which, when the program is executed by a computer, causes the computer to carry out one or more methods in accordance with claim 17.

* * * * *